US007325000B2

(12) United States Patent
Mahon et al.

(10) Patent No.: US 7,325,000 B2
(45) Date of Patent: Jan. 29, 2008

(54) SYSTEM AND METHOD FOR PERFORMANCE MEASUREMENT QUALITY ASSURANCE

(75) Inventors: Olivia G. Mahon, Marietta, GA (US); Brandon R. Gullett, Atlanta, GA (US); Jason D. Morris, Smyrna, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 529 days.

(21) Appl. No.: 10/871,296

(22) Filed: Jun. 17, 2004

(65) Prior Publication Data

US 2004/0230563 A1 Nov. 18, 2004

Related U.S. Application Data

(62) Division of application No. 09/943,616, filed on Aug. 30, 2001, now Pat. No. 6,785,361.

(51) Int. Cl.
G06F 7/00 (2006.01)
G06F 17/30 (2006.01)
(52) U.S. Cl. ...................................... 707/101; 707/204
(58) Field of Classification Search ................ 707/101, 707/204
See application file for complete search history.

(56) References Cited

U.S. PATENT DOCUMENTS

| 5,155,761 | A | 10/1992 | Hammond |
| 5,784,438 | A | 7/1998 | Martinez |
| 5,793,771 | A | 8/1998 | Darland et al. |
| 6,032,039 | A | 2/2000 | Kaplan |
| 6,269,330 | B1 | 7/2001 | Cidon et al. |
| 6,301,701 | B1 | 10/2001 | Walker et al. |
| 6,363,053 | B1 | 3/2002 | Schuster et al. |
| 6,510,463 | B1 | 1/2003 | Farhat et al. |
| 6,556,659 | B1* | 4/2003 | Bowman-Amuah ........ 379/9.04 |
| 6,609,120 | B1* | 8/2003 | Honarvar et al. .............. 707/3 |
| 6,625,651 | B1 | 9/2003 | Swartz et al. |
| 6,952,827 | B1* | 10/2005 | Alverson et al. ........... 718/104 |
| 2002/0052862 | A1* | 5/2002 | Scott et al. .................... 707/1 |

OTHER PUBLICATIONS

Abran, Alain et al. "Trial Version of 0.95 of the Guide to the Software Engineering Body of Knowledge". IEEE. May 2001.
Peng et al. "Software Error Analysis." NIST Special Publication 500-209. Mar. 1993.
Wallace, et al. "Software Quality Assurance: Documentation and Reviews". NISTIR 4909. Jun. 11, 2001.

* cited by examiner

Primary Examiner—Kuen S Lu
(74) Attorney, Agent, or Firm—Cantor Colburn LLP

(57) ABSTRACT

In order to provide in-region, interLATA service, a bell operating company (BOC) must provide telecommunications service to competitive local exchange carriers (CLEC) in a non-discriminatory manner. To demonstrate that the BOC service to the CLEC is non-discriminatory, the BOC provides a series of performance measures to regulatory agencies and to the CLEC. A system and method is described for ensuring the quality of those performance measurements. The system and method provide for identifying sub-processes within a performance measurement process (PMP), identifying critical audit points within each sub-process, and implementing control measures corresponding to each critical audit point. The system and method help to eliminate the need for time-consuming and expensive third-party audits of the PMP.

16 Claims, 3 Drawing Sheets

SYSTEM AND METHOD FOR PERFORMANCE MEASUREMENT QUALITY ASSURANCE

CROSS-REFERENCE TO RELATED APPLICATIONS

This application is a divisional of U.S. patent application Ser. No. 09/943,616 filed Aug. 30, 2001 now U.S. Pat. No. 6,785,361, the contents of which are incorporated by reference herein in their entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

The present invention generally relates to performance measures in a telecommunications network. The present invention more particularly relates to providing systems and methods for ensuring the quality of performance measures in a telecommunications system.

BACKGROUND

In 1982, American Telephone and Telegraph (AT&T) was ordered to divest local and regional telephone service. The result of this divestiture was the creation of the Bell Operating Companies (BOC). The Bell System was divided into regions and a BOC was created to service each region. The regions consist of multiple local access transport areas (LATA). A LATA generally comprises at least one major metropolitan area. The regional BOC provides service within the LATAs. Inter-Exchange Carriers (IEC), such as AT&T and Sprint, provide service between LATAs and between regions. In general, federal law prohibits BOCs from providing interLATA service.

The prohibition is not absolute. Under § 271 of the Telecommunications Act of 1996, Pub. LA. No. 104-104, 110 Stat. 56 (1996), a BOC may provide interLATA service within a region. However, in order to provide interLATA service, the FCC must determine that the BOC meets a fourteen-point competitive checklist, § 271 (c)(2)(B), and that granting permission to provide in-region, interLATA service would be in the public interest.

The fourteen point competitive checklist ensures that the BOC is granting competitive local exchange carriers (CLEC) access equivalent to that offered by the BOC to itself and to its retail subscribers. The BOC may satisfy the checklist by: (1) showing that at least one facilities-based local competitor is actually providing local exchange service in the BOC's territory, or (2) by submitting a "Statement of Generally Available Terms," identifying the steps the BOC has taken to allow competitors to interconnect and obtain the resources the competitor needs to offer service in competition with the BOC.

A BOC may implement a voluntary self-effectuating mechanism (VSEEMS) to help demonstrate its attempt to provide parity to a CLEC. Under a VSEEMS program, the BOC pays the CLEC a penalty if the BOC fails to provide non-discriminatory service to the CLEC. A BOC may also agree to pay the government a penalty for failing to provide non-discriminatory service as a condition for creation of the BOC.

The fourteen-point checklist requires, in essence, that the BOC demonstrate the offering of stable, nondiscriminatory execution of all operations support systems (OSS) functions for the three modes of competitive entry: interconnection, resale and unbundled network elements. OSS functions include pre-ordering, ordering, provisioning, maintenance and repair, and billing for services. The three modes of competitive entry are interrelated. Interconnection refers to the ability of the BOC network and that of a competitive local exchange carrier (CLEC) to communicate with one another. Resale refers to the requirement that the BOC offer services to CLECs at below retail prices. And unbundling requires that the BOC sell a CLEC access to individual components, such as switches or lines, rather than mandating that the CLEC purchase access to a "bundle" of network services.

To demonstrate a non-discriminatory offering, the BOC must implement a process to generate and report performance measures. The BOC must make these measures available to both CLECs and regulatory agencies, including the Federal Communications Commission (FCC) and local state public service commissions.

Compiling and reporting the performance measures is a complex process. The complexity is due primarily to the complexity of the underlying system necessary to provide telecommunications service. Not only is the task or providing performance measures complex, the accuracy of the reports is critical to ensure that the BOC can complete the competitive checklist to the satisfaction of the state public service commission and, ultimately, the FCC. Due to the complexity of the performance measurement process (PMP), an effective and reliable quality assurance (QA) process is necessary to ensure the accuracy of the PMP reports.

The BOC may perform internal audits in an effort to QA the PMP. If the internal audits are insufficient to ensure the accuracy of the PMP reports, the BOC may employ third-party audits. But third-party audits are both time consuming and expensive. An internal audit process that is capable of satisfying regulatory agencies as to the accuracy of the PMP reports is necessary.

Conventional methods of ensuring the quality of a PMP are inadequate. No efficient and reliable method exists to ensure that PMP reports are produced accurately and reliably each month. Additionally, when a new measure is added to the PMP process, conventional systems are unable to provide audit information sufficient to allow an auditor to understand the purpose and possible effects of the change in a timely and efficient manner.

Also, in many cases, although a technical support staff is able to solve problems occurring during the PMP process, the information to efficiently ensure that (1) the support staff correctly performed the repair and (2) the resulting report is accurate do not exist. Additionally, without sufficient detail related to changes occurring in the PMP, it has proven very difficult to successfully implement a PMP change or correction across multiple BOC sites in a consistent manner.

Errors during the PMP sometimes result in inaccurate reporting of performance measures to both regulatory agencies and CLECs. These inaccuracies lead to both short and long-term costs to the BOC. In the short term, the BOC pays fines needlessly under VSEEMS programs for failing to offer parity of services to CLECs. In the long term, the regulatory agencies delay the approval of the BOC offering in-region, interLATA service, a potentially large opportunity cost for the BOC.

One potential approach to ensuring the accuracy of the PMP is implementation of a generic quality process. Various generic quality assurance approaches exist. For example, the International Organization for Standardization (ISO) publishes a set of standards called the ISO 9000 standards that provide a framework an organization can use to ensure that a process meets applicable regulatory guidelines. The Institute of Electrical and Electronics Engineers, Inc. (IEEE) has also published a standard for software quality assurance plans (SQAP). Intended for use in developing and maintaining critical software, the standard provides uniform, minimum acceptable requirements for the preparation and content of Software Quality Assurance Plans (IEEE 730-1998). Also, the National Institute of Standards and Technology has published various documents related to software quality assurance, including a document specifically directed to software error analysis. Although each of these frameworks or publications provides general information for establishing a quality assurance process, they do not provide specific methods for actually implementing a quality assurance program for the processes needed by the BOC.

Generic methods of ensuring the quality of a process offer the advantage of integrating the quality assurance process. However, the generic methods are theoretical. Ensuring the quality of a performance measurement process requires a concrete implementation rather than a theoretical approach.

SUMMARY

The present invention comprises a system and method for ensuring the quality of a performance measurement in a telecommunications network. An embodiment of the present invention comprises a performance measurement data warehouse (PMDW) for storing the information necessary to create service quality measurement SQM) reports. An embodiment of the present invention also comprises a user interface for entering and maintaining performance measurement quality assurance plan (PMQAP) information and a data depository for storing the PMQAP information. The PMDW may comprise a relational database. In another embodiment of the present invention, the PMDW comprises a multidimensional database stored as a file in persistent file storage, or other database or storage system.

The user interface may comprise a menu. From the menu, a user can navigate to one of several additional interfaces. These interfaces include an interface for requesting an additional performance measure and one for requesting a modification of an existing performance measure. Another interface allows a user to prioritize various additions and modifications. Also available from the menu is an interface that allows the user to generate documentation regarding changes to the performance measurement process (PMP).

Another embodiment of the present invention provides a user interface for mapping data fields to business requirements. The user interface also provides the user with the capability to identify quality control points and create corresponding quality control measures.

Yet another embodiment of the present invention comprises a data extractor, a data loader, and a process log recorder. The data extractor retrieves data from existing transactional and operational data stores. The data loader loads the extracted data into the PMDW. The process log recorder monitors extraction, load and other batch jobs and records the status of those jobs, including whether or not they executed successfully and the duration of the job execution.

An embodiment of the present invention allows the user to perform a process to ensure the accuracy of the SQM reports. The process includes accessing the PMDW, identifying sub-processes within the PMP, identifying audit points within the sub-processes and implementing quality control measures corresponding to the audit points. The PMP sub-process may comprise a change control process. The change control process may comprise numerous steps. These steps include identifying a business requirement and documenting the business requirement. In one embodiment, a user enters the business requirement in a change control-tracking tool. Once the business requirement has been identified and documented, a business analyst converts the business requirement into a technical requirement so that it may be implemented in the PMP.

Once the technical requirement has been defined, a committee, such as a change control board (CCB), determines the priority of the technical requirement with regards to any other pending technical requirement. The committee also creates a production release note corresponding the technical requirement. The technical requirement is then implemented and tested.

In one embodiment of the present invention, a change request is received from a third party. The third party may be a state or federal regulator or a competitive local exchange carrier (CLEC). A change request may also emanate from within the BOC.

An embodiment of the present invention provides numerous advantages over conventional approaches to PMP quality assurance. A data warehouse containing all the data necessary to provide the service quality measures and the process to ensure the accuracy of those measures provides a competitive advantage over a BOC who lacks either the data warehouse or the quality assurance process or both.

By helping to ensure that the PMP measures are accurate and verifiable, an embodiment of the present invention prevents errors that might prevent a bell operating company (BOC) from gaining timely approval to provide in-region, interLATA service. A delay in gaining approval will result in an opportunity cost to the BOC, the loss of access to the long-distance telephone market—a 98 billion-dollar market in 1999, according to statistics published by the FCC.

Further, by ensuring the accuracy of the SQM reports generated by the PMP, an embodiment of the present invention allows the BOC to avoid paying voluntary self-effectuating mechanism (VSEEMS) penalties to competitive local exchange carriers (CLEC) unnecessarily.

Also, by providing a single integrated source of quality assurance information for the PMP, an embodiment of the present invention allows the BOC to avoid the time and expense involved in third party testing.

An embodiment of the present invention also provides a single, integrated, comprehensive repository of PMP QA information, decreasing the time and resources necessary to address problems occurring during the PMP by simplifying the location of information related to the PMP. When a problem is detected in a performance measurement process determining where the problem originates is costly in terms of time and resources. Internal support staff must analyze and solve each problem without benefit of previous experience. In an embodiment of the present invention, when a problem occurs, the technical support resource uses the PMQAP to isolate and remedy the problem. Decreasing the amount of time required to identify and remedy a problem results in numerous cost savings, including a reduction or elimination in unnecessary penalties as well as a reduction in the internal cost necessary to actually remedy the problem.

Further, an embodiment of the present invention provides the ability to recreate a report, as it existed at a point in time in the past. Through the use of version control or by reversing changes contained in documentation, a developer can recreate the report. The ability to recreate a report from a point in time allows an auditor to examine and address errors in an SQM report that were not present in prior versions of the report. Also, any apparent discrepancies between subsequent and prior versions of an SQM report help to highlight possible errors in the PMP, allowing those potential errors to be more easily addressed than would otherwise be possible.

Further details and advantages of the present invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide a system and method for ensuring the quality of a performance measure in a telecommunications network. In order to comply with an incumbent local exchange carrier statutory requirement for providing in-region, interLATA telecommunications service, a Bell Operating Company (BOC) maintains a performance measurement process (PMP). The PMP of the embodiment described herein comprises a process for compiling, merging and summarizing ordering, provisioning and other data related to the provision of telecommunications services in order to generate service quality measurement (SQM) reports.

Rigorous quality assurance and change control procedures are essential to the reporting of accurate service quality measurements. The accuracy of the measures is further ensured through the use of independent testing. An embodiment of the present invention ensures that PMP quality assurance processes are that of sufficient accuracy to satisfy independent testing will remain so.

Figure 1:
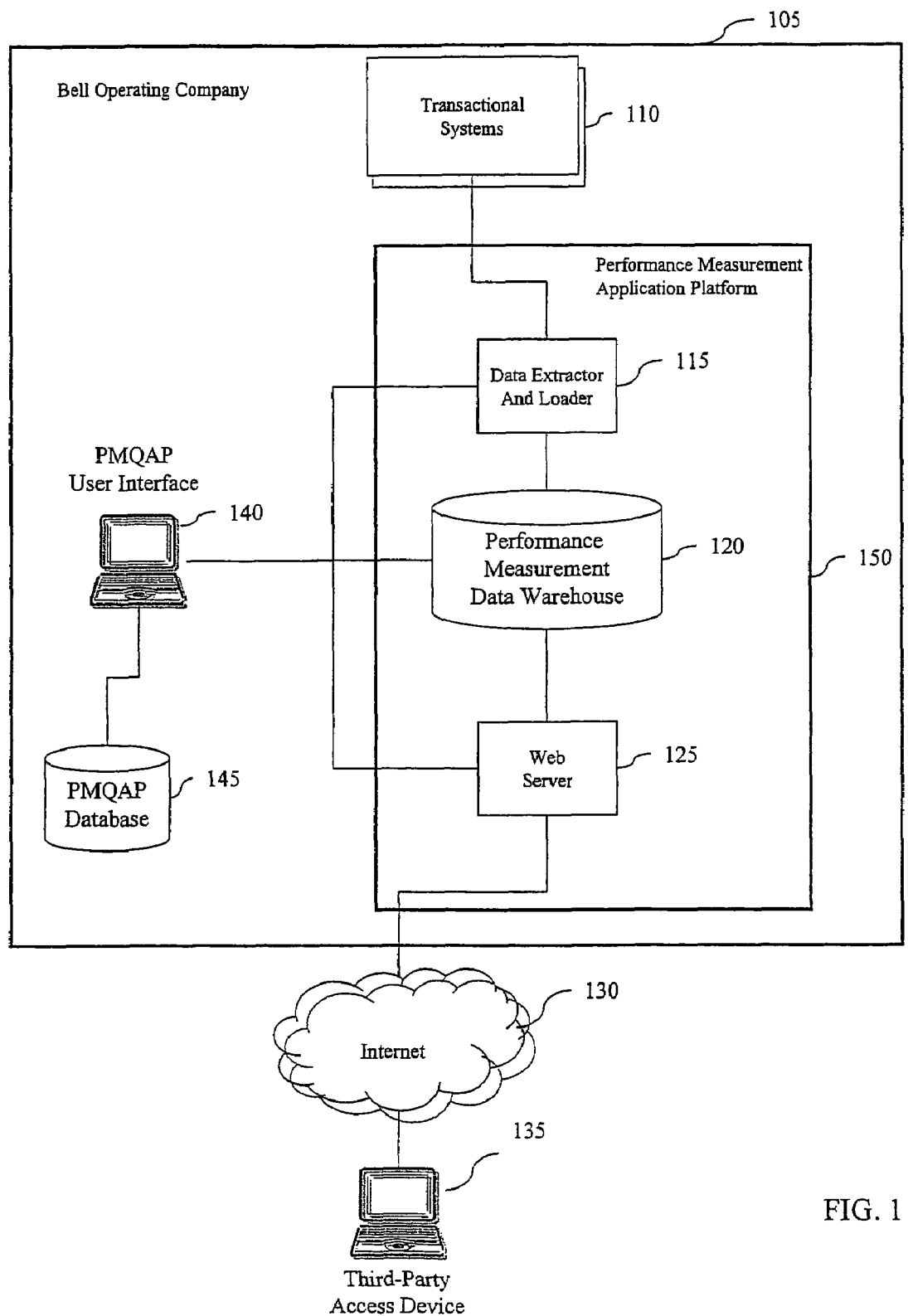
FIG. 1 is a diagram of an exemplary embodiment and an exemplary environment for operation of an embodiment of the present invention.

FIG. 1 illustrates an embodiment of the present invention as a computer system. A plurality of transactional and operational systems 110 within a bell operating company (BOC) 105 produce and/or store data related to the provision of telecommunication services. This data includes service requests, response times, problem reoccurrence rates and other data, which is helpful in evaluating the level of service a BOC 105 is providing to its customers. The PMP is the process that defines how that data is to be acquired, stored and reported.

A performance measurement application platform (PMAP) 150 is a computer system designed to implement the PMP, including the creation of service quality measurement (SQM) reports. In the embodiment shown in FIG. 1, the PMAP computer system 150 comprises a performance measurement data warehouse (PMDW) 120, a data extractor and loader 115 to load the PMDW 120, and a web server 125 to carry out the processes of generating and providing SQM reports based on PMDW 120 data.

The initial PMP sub-processes carried out by the PMAP 150 are extracting the data related to the provision of telecommunications services and loading it into the PMDW 120. In the embodiment shown, the data is extracted from the transactional and operational systems 110 and loaded into the PMDW 120 by a computer running data extraction and load software 115.

The data extractor and loader 115 software extracts a data point or plurality of data points (data) from existing transactional and operational computer systems 110. The software may comprise a variety of different extraction methods, including third-generation languages, structured query language (SQL) queries and other standardized and proprietary extraction routines. The software then transforms and cleanses the data so that data from a variety of sources may be combined in the PMDW 120. Finally, the load programs populate the tables in the PMDW 120.

In one embodiment of the present invention, the extraction software is written in a third-generation language such as COBOL or Pascal. In another embodiment, the extraction software is written as a database query in structured query language (SQL). Various other extraction routines may be utilized, including standardized data extraction application interfaces such as SAP business application programming interfaces (BAPI). Once the data related to the provision of telecommunications services has been extracted, the extractor and loader 115 executes software to cleanse and transform the data and loads it into the PMDW 120. Because of the array of services and because of the vast geographical area serviced by a BOC 105, the PMDW 120 in the embodiment shown comprises terabytes of data.

The PMDW 120 may include both summarized and detailed information related to the provision of telecommunications service. A data warehouse generally comprises tables in a relational database, although various other data structures may be utilized. PMDW 120 data comprises several performance measurement categories, including for example: the response time of the BOC's telecommunications network and the timeliness and effectiveness of equipment installation and repair services.

In the embodiment shown in FIG. 1, the PMDW 120 comprises an Oracle® relational database. The loader software comprises Oracle® SQL*Loader®, which provides the developer of the application with the ability to create a file describing the data to be loaded, and subsequently create an automated load routine.

In addition to extraction and load processes, the PMAP 150 includes programs for accessing the data in the PMDW 120 and creating the SQM reports and otherwise making information available to competitive local exchange carriers (CLECs) and various other third parties. The SQM reports present performance measures to satisfy a variety of reporting needs. For example, one SQM report details the percent of time a response is received within a predefined number of seconds. Another SQM report details the number of problems reoccurring within a predefined number of days of a repair.

In an embodiment of the present invention, a web server 125 has access to the PMDW 120 via a common database access method, such as open database connectivity (ODBC). The web server 125 may utilize the Solaris® operating system and the Cold Fusion® web application server to provide access to the PMDW 120. Cold Fusion® server software provides the web server 125 the functionality to access the PMDW 120, dynamically generate the SQM reports as HTML pages and transmit the resulting HTML pages to a CLEC or third-party requestor.

In the embodiment shown in FIG. 1, a third party, such as the CLEC, uses an access device 135 to access the web server 125 through the Internet 130. By specifying a uniform resource locator (URL), the third-party accesses reports produced by the web server 125 based on data from the PMDW 120. For example, an employee in a CLEC desires to determine whether the BOC response time to the CLEC's telecommunications service orders as compared to the BOC response time to the orders of the BOC's retail customers. The CLEC employee enters a URL on computer 135 that is directed to a service order response time report on web server 125. In response to the request, the web server 125 generates the report and transmits it to the CLEC employee's computer 135 over the Internet 130.

An embodiment of the present invention also comprises processes to ensure the overall quality and integrity of the PMP. These processes are consolidated into a single, integrated performance measurement quality assurance process (PMQAP). A client computer executes a PMQAP user interface 140 within the BOC 105 to access the programs and databases of the PMAP 150, including the extractor and loader 115, the PMDW 120 and the web server 125. The PMQAP user interface 140 includes elements to enter, maintain and view quality-assurance information related to each of the processes, sub-processes, audit points and quality control measures present in the PMAP 150. Examples of such quality-assurance information comprise change-control and software version documentation, production run schedules and monthly validation plans. The PMQAP user interface 140 ensures that changes and additions to the PMAP 150 occur in a systematic and documented manner.

The quality-assurance information entered and maintained in the PMQAP user interface 140 is stored in the PMQAP database 145. The PMQAP database 145 comprises a data store containing information detailing the existing extraction and load process as well as validation steps performed on the SQM reports that are produced and made available to third parties.

In one embodiment of the present invention, the PMQAP user interface 140 comprises a series of Microsoft® Visual Basic forms for accessing the PMQAP database 145 comprises an Oracle® relational database. In another embodiment of the present invention, the PMQAP user interface 140 comprises a plurality of hypertext markup language (HTML) forms, dynamically generated by a web server, accessing the Oracle® database. In yet another embodiment of the present invention, the PMQAP user interface 140 comprises a word processing application, such as Microsoft® Word, and the PMQAP database 145 comprises a computer hard disk or other persistent data store.

Figure 2:
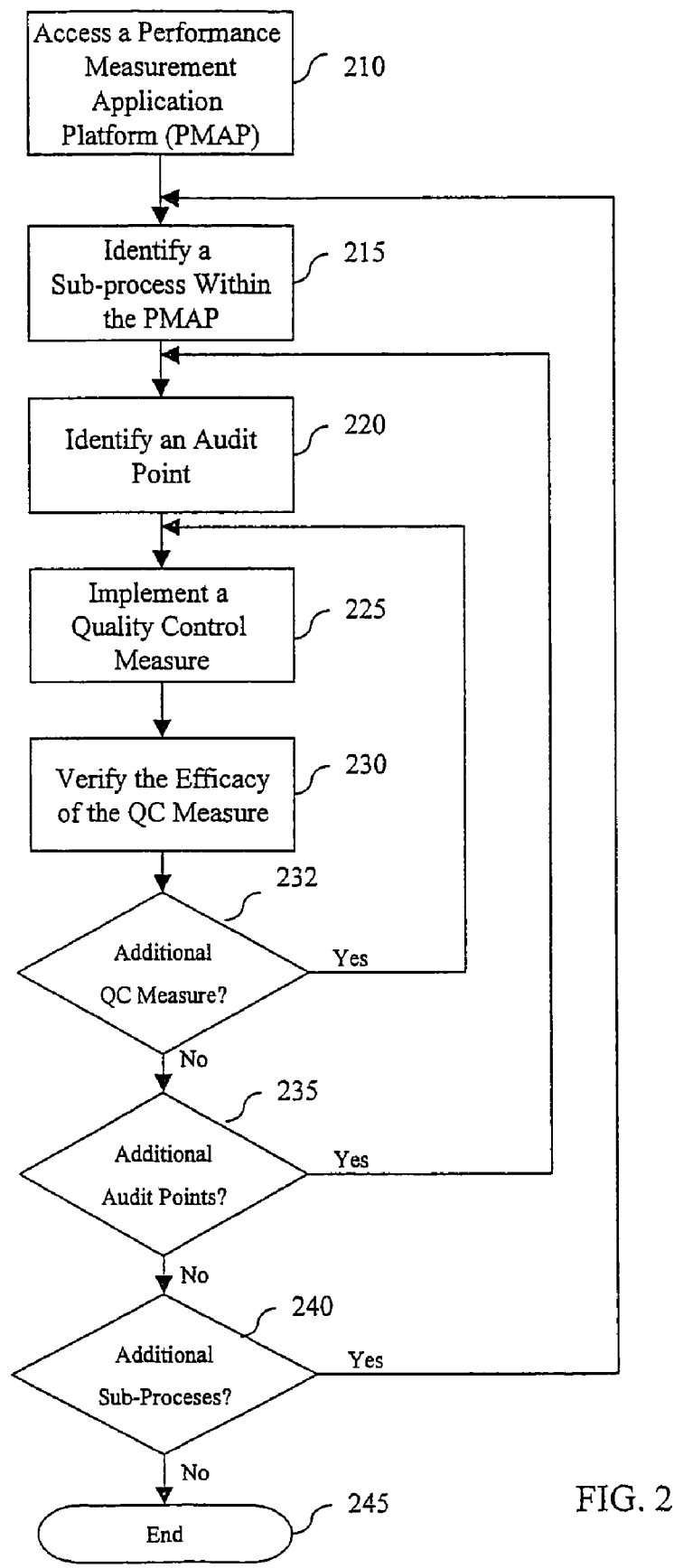
FIG. 2 is a flowchart illustrating an exemplary method for identifying audit points and implementing quality control measures in an embodiment of the present invention.

To create and maintain a PMQAP, an embodiment of the present invention implements a process as illustrated in FIG. 2 in a system as illustrated in FIG. 1. Referring to FIG. 2, a user maintaining the PMQAP uses a PMQAP user interface 140 to access the PMAP 150, 210, including the data extractor and loader 115, the PMDW 120, and the web server 125. Once the PMQAP user interface 140 accesses these PMAP 150 components, the user identifies PMP sub-processes occurring within the PMAP 150, 215. The user accomplishes this identification by examining the various components of the PMAP and grouping like processes within these components together by function or some other logical grouping criteria.

For example, in an embodiment of the present invention, the PMAP 150 comprises a data extractor and loader 115. The data extractor and loader 115 comprises a plurality of programs to extract data from the transactional systems 110 and load the PMDW 120. A specific extract program may change over time, requiring change control measures. Also, the extract program may execute nightly in a production environment, requiring documentation relating to the nightly production run. Further, to ensure the program is executing correctly will require periodic validation. The user identifies three distinct sub-processes relating to the extract program: change control, production, and validation.

Within a sub-process, the user identifies an audit point 220. The user identifies the audit point as a critical step within the selected sub-process. The audit point may be critical for a variety of reasons. For example, the audit point may be a critical step because it is a likely point of error. The audit point may also be a critical step at which to produce documentation in order to ensure the accuracy and ability to audit the PMAP 150. For example, in the change-control sub-process identified above, an audit point may comprise a subject matter expert (SME) requesting a change to the extract program. The change request comprises a critical step in the process because it requires resources to develop and implement and because the request may eventually result in a change to the PMAP 150.

Once the audit point has been identified, a user designs and implements a quality control (QC) measure 225 to ensure that the PMAP 150 performs accurately and reliably and that adequate documentation of changes and of existing PMAP 150 sub-processes exists. For example, in order to ensure that the SME's requirement for a change to the extract program is tracked and implemented correctly, the user may design a business requirement document template and require that a corresponding business requirement document be created for each change to the extract program. After implementation of the QC measure, if problems occur in the extract program, the business requirements document can provide crucial information for understanding why a change to the extract program was necessary.

After implementation of the QC measure, ongoing validation must be performed to ensure the ongoing efficacy of the measure 230. For example, in an embodiment of the present invention, a user creates business requirement documents for each change to an extract program. Periodically, changes relating to the data extraction program in the PMAP 150 are printed. The business requirements documents are then compared to actual changes in the data extraction programs to ensure that all changes made to the programs are recorded in a business requirements document, and conversely, that all business requirements have, in fact, been implemented in the data extraction programs.

A user of the PMQAP user interface 140 may identify, implement, and verify one or more QA measures for an audit point and one or more audit points within a sub-process. A user may also identify audit points within more than one sub-process within the PMP of the PMAP 150 and may implement and verify a QC measure, which applies to one or more audit points.

Referring to FIG. 2, once a user verifies the accuracy of a QC measure 230 for a previously-identified audit point, the user determines whether the user wishes implement 225 and verify 230 additional QC measures for the previously-identified audit point 232. If so, the user repeats the implementation 225 and verification 230 steps for each additional implemented QC measure.

A user may also wish to identify additional audit points within the currently-identified sub-process 235. If so, the user repeats the identification 220, implementation 225, and verification 230 steps in the process as described above for a newly-identified audit point. If the user does not wish to identify additional audit points for a sub-process, the user determines whether the user wishes to identify one or more additional sub-processes within the PMAP 150, 240. If so, the user identifies the new sub-process 215 and repeats the identification 220, implementation 225, and verification 230 of audit points and QC measures in the process. For each additional sub-process, the user may identify multiple audit points 235. Once a user has identified all sub-processes, the process ends 245.

Figure 3:
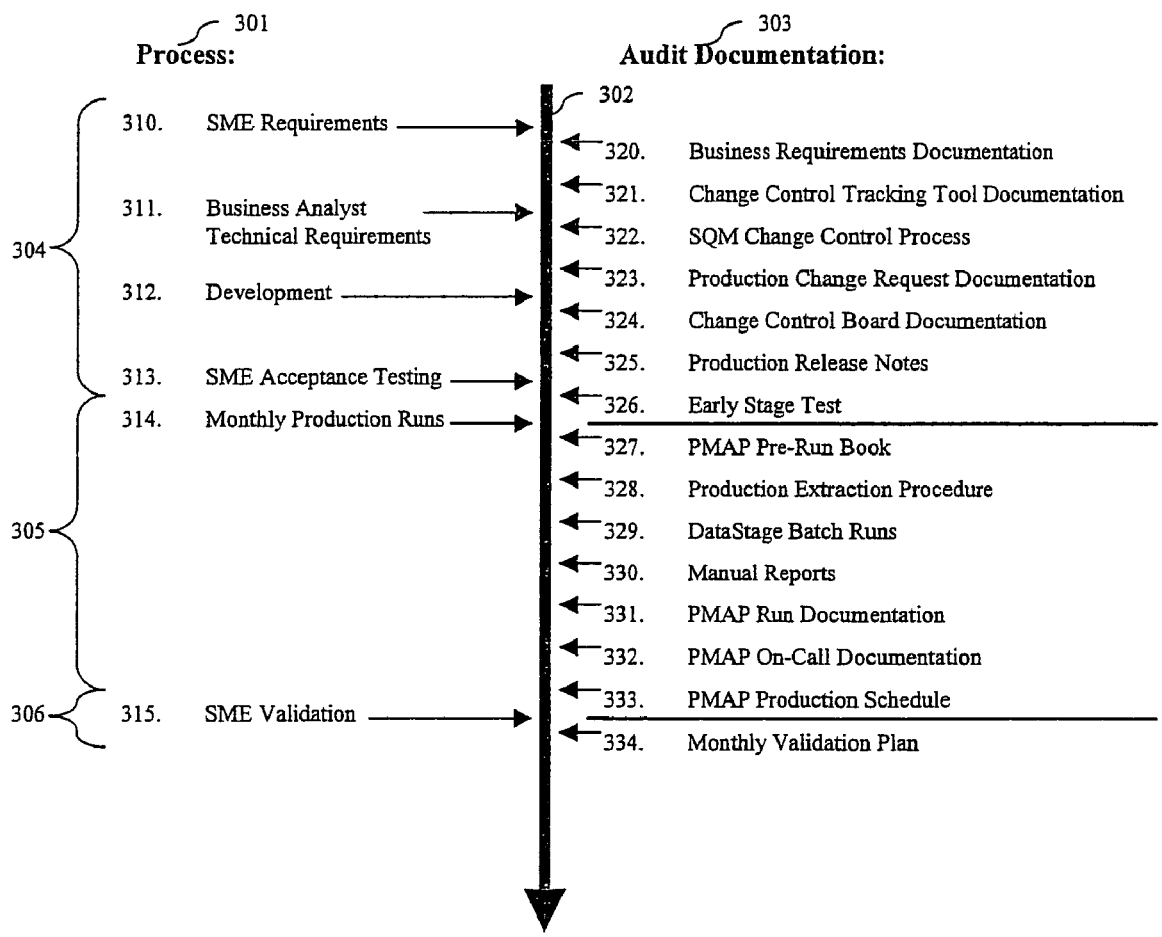
FIG. 3 is a timing diagram illustrating the relationship between the change process and the required audit documentation in an embodiment of the present invention.

FIG. 3 illustrates a PMQAP created in an embodiment of the present invention. A user practicing the steps illustrated in FIG. 2 on the PMAP 150 illustrated in FIG. 1 creates the PMQAP shown in FIG. 3. The exemplary PMQAP illustrated in FIG. 3 comprises the PMQAP process carried out when a change is made to the PMAP 150.

To create the PMQAP shown in FIG. 3, a user first identified the sub-processes 215 occurring during a change in the PMAP 150. In the example shown in FIG. 3, the three sub-processes are change control 304, production 305 and validation 306. Within each of these sub-processes, the user identified a critical step or audit point 220. These audit points 310-315 are illustrated in FIG. 3 under the column labeled "process" 301. For example, the first critical step in making a change to the PMAP 150 is when the SME defines the requirements 310.

For each identified audit point, the user implemented 225 and verified 230 a QC measure. The QC measures 320-334 are shown in FIG. 3 in the column labeled "Audit Documentation" 303. In the embodiment shown in FIG. 3, the user implemented and verified business requirements documentation 320. Once the user implemented 225 and verified 230 a QC measure, the user determines whether or not additional QC measures are required for an audit point 232, and if so repeats the implementation 225 and verification 230 steps as necessary. Referring again to FIG. 3, the user implemented and verified an additional QC measure, change control tracking tool documentation 321, for the SME requirements 310 audit point.

Once all the QC measures for an audit point had been implemented and verified, the user determined whether additional audit points were necessary within the sub process. In the embodiment shown in FIG. 3, the user identified three additional audit points 311-313. Once all the additional audit points were identified and the QC measures implemented and verified for a sub-process, the user determined whether additional sub-processes exist 240. As mentioned previously, in the PMQAP illustrated in FIG. 3, the user identified two additional sub-processes: production 305 and validation 306. For each of these sub-processes, the audit point identification 220 and QC measure implementation 225 and verification 230 steps were repeated, resulting in the additional audit points and QC measures shown in FIG. 3.

In the embodiment shown in FIG. 3, the process of making a change to the PMAP 150 occurs over a time period. The vertical arrow 302 indicates the progression of time. As the change process progresses, each of the control measures implemented at audit points in the process must be completed.

According to the PMQAP as illustrated in FIG. 3, the critical step in process 301 occurs when a subject matter expert (SME) (a human being in the embodiment shown) develops a description of a business requirement 310. The requirement may originate from any number of sources and be requested for a variety of reasons. For example, a regulatory agency, such as the Federal Communications Commission or state public service commission, may require a new performance measurement or a change to an existing one to more closely comply with the fourteen point checklist. Also, a CLEC may request an additional performance measurement to ensure that the BOC is providing parity of service to the CLEC. Another potential source of changes is a BOC internal user who identifies an error occurring in an SQM 150 report.

In the PMQAP illustrated in FIG. 3, two QC measures have been implemented for this audit point. First the SME must create Business Requirements Documentation 320. The SME communicates with both business and technical resources to ensure that the change is fully and correctly documented. Next, the SME enters the new requirement in an automated change-tracking tool, which produces the necessary change control tracking documentation 321. In another embodiment, the SME creates a word processing document describing the change. The document serves to detail the changes control and serves as a change-control tracking device, satisfying both QC measures 320 and 321.

Once the SME develops the business requirement, the next critical step in process 301 occurs; a business analyst (also a human being in the embodiment shown) works with the SME to develop complete and accurate technical requirements 311 in order to implement the business requirement in the PMAP 150. The business analyst converts the business requirement into a technical specification, which can be used to create a new performance measurement or change an existing measurement in the PMAP 150. The technical specification describes physical tables, files, programs, servers and related items, as well as existing processes that the developer will need to access or modify to make the change to the PMAP 150.

While developing the technical specifications, the business analyst follows a service quality measure (SQM) change control process 322, implemented as a QC measure for the business analyst technical requirements 311 audit point. The SQM change control process defines the procedure for requesting, updating, reviewing, posting, tracking and archiving change to an SQM, establishes version control procedures and provides a timeline for implementing SQM change requests. For example the SQM change control process may comprise creating a document including the requester, the current version of the SQM, a description of the request, the timeline for finishing the request and sign-off of any necessary parties.

In an embodiment of the present invention, once the business analyst has fully defined the technical specification for the change, the business analyst generates production change request documentation 323, the second QC measure implemented for the business analyst technical requirements 311 audit point.

After the business analyst creates the technical specification, another critical step in the process may begin, development or modification of the PMAP 150 program 312. In an embodiment of the present invention, multiple changes may be submitted simultaneously, and therefore the administration of the changes requires a QC measure. In the embodiment illustrated in FIG. 3, this measure comprises the change control board documentation QC measure 324.

In an embodiment of the present invention, a committee, such as a change control board (CCB), is responsible for administering changes to the PMAP 150. The committee prioritizes changes and provides status related to the development process. In order to prioritize the technical requirements, the committee must balance the resource requirements of a proposed change with the problem or opportunity to be addressed.

The committee generates change documentation, detailing the results of the prioritization and the ongoing status of the change 324. Once approval and subsequent development of the change occurs, the committee develops documentation to satisfy the second QC measure applied to the development 312 step, production release notes 325.

In an embodiment of the present invention, the production release notes allow an auditor to determine the status of the PMAP 150 at any point in time by determining when specific changes were implemented. The production release notes describe the type of program, the affected reports and other relevant information. If questions arise regarding changes in a report, a previous version of the report can be recreated to address those issues by reversing changes presented in the documentation or by simply using version control software to revert to an earlier version of the report.

Once the committee sets the priority for a change, development of the change may begin. In order to limit any potential disruption to the PMAP 150, development of a change occurs on a development PMAP. Changes made on the development PMAP are not accessible to third parties. To help ensure that the new or modified program will execute properly on the production PMAP 150, the development platform comprises the same components as the production PMAP 150, and thus the development process will be described with reference to the production PMAP 150 as shown in FIG. 1.

A regulatory body's request for a new SQM provides an illustration of the process of handling changes to the PMAP 150. This exemplary request requires changes to all three aspects of the PMAP 150: the data extractor and loader 115, the PMDW 120 and the web server 125. The business analyst determines that the data needed for the new SQM does not exist in the PMDW 120.

In an embodiment of the present invention, development includes multiple personnel, including application architects, developers, data base administrators and a testing team. The application architect assists in the overall design of the change, including modeling database tables, addressing inter-organizational issues, controlling staffing utilized to make the change and scheduling the development process. The developers make the actual change to the application software. The database administrators maintain the software integrity of the databases, resolve hardware issues and maintain security. The testing teams assist in testing the new or modified processes.

In order to satisfy the request from the regulatory body, an application architect designs new tables for the PMDW 120, new extraction and load routines for the data extractor and loader 115 and the report format to be implemented on the web server 125 in order to satisfy the request for the new SQM. A programmer makes the changes to the data extractor and loader to retrieve the data for the new SQM from the transactional and operational databases 110. A data base administrator adds the new tables to the PMDW 120. And a web application developer creates programs on the web server 125 to extract the data from PMDW 120 and create HTML reports, transmitting the new SQM to a third party 135 via the Internet 130.

The SME next performs testing to ensure that the change satisfies the initial business requirement. Testing comprises another critical step in the process 301, SME acceptance testing 313. In the embodiment shown in FIG. 3, in order to ensure the accuracy of the SME acceptance testing 313, a QC measure has been implemented. This QC measure is the early stage data test 326. Typically, data from an earlier month's production run is compared to the results from the newly-created or modified program to verify that the program is working correctly. If the test is successful, the SME signifies that the change is successful by making an entry in the change control-tracking tool.

Once the change has been successfully tested, the change is moved from the development PMAP to the production PMAP 150. For example, if the change includes a new report or a change to an existing report, a program change will be made on the web server 125. Once tested, the developer copies the program to the production web server. When the new or modified process is executed on the production PMAP 150, third parties can access the new or modified report.

In the embodiment shown in FIG. 3, Monthly Production Runs 314 comprises the next audit point for a change to the PMAP 150. Various QC measures have been implemented for this audit point 327-333. In the embodiment shown, a SME, business analyst, technical analyst or other user creates the documentation necessary to ensure the accuracy and reliability of extracting data related to a requested change from the transactional databases 110 and loading the data into the PMDW 120. This documentation comprises a PMAP Pre-Run Book 327, a production extraction procedure 328 and a DataStage batch run 329.

A PMAP Pre-Run Book 327 must be created as part of a change to the PMAP 150. The PMAP Pre-Run Book includes a checklist of activities to be completed before a job executes. For example, a regulatory agency requires a new SQM. In order to provide the new SQM, the PMDW 120 is modified and a new program is added to the data extractor and loader 115. The first step in the PMAP Pre-Run Book checklist is for the user to verify that the database tables and stored procedures necessary to store the new SQM have been created in the database. The next step in the checklist is to ensure that any parameters necessary to execute the data extract are correctly entered in the data extract programs on the data extractor and loader 115. The final step in the checklist is for the user to verify that the necessary privileges have been granted for the extract and load program to successfully extract data from the transactional systems 110 and load the PMDW 120.

A production extraction procedure 328 details the process of extracting the required data from a transactional database. For example, to perform the extract above, the production extraction procedure includes the steps for logging onto the transactional database 110 containing the required data. The steps also include any commands necessary to copy data files, execute queries or perform any additional related functions necessary to extract the data from the transactional database 110.

DataStage batch runs 329 detail additional processes for collecting data related to an SQM. For example, an SQM requires that ordering and provisioning data be combined on one report. A business analyst has determined that the most efficient method for providing this data is to combine the data in the PMDW 120. The analyst creates the DataStage batch run, listing the processes for combining this information into a single PMDW 120 table. These processes may include summarizing the data and then merging the data based on common unique identifiers.

The PMP includes both automated and manual loading of data to support the creation of SQM reports. To ensure the accuracy of the manual report process, a Manual Reports 330 QC measure has also been implemented within the Monthly Production Runs 314 audit point shown in FIG. 3. The Manual Reports 330 QC measure comprises creating documentation necessary to detail the manual loading of data for creation of manual reports for a specific SQM. For example, data required to produce an SQM may only exist in an Excel spreadsheet. The creator of the manual reports documentation details the specific Excel spreadsheet, the method of extracting the data from the Excel spreadsheet and the tables within the PMDW 120 in which the data is to be stored.

In an embodiment of the present invention additional QC measures have been implemented within the Monthly Production Runs 314 audit point. SMEs, business analysts, technical analysts and others create PMAP run documentation 331, on-call documentation 332 and production schedules 333 to detail the process that occurs to produce automated reports. This documentation aids in determining the efficiency of the overall PMAP 150 as well as how to diagnose and remedy errors that occur during the PMAP 150. For example, in one embodiment of the present invention, a technical analyst create run documentation 331, which includes the execution duration for a program that creates a specific SQM report. The technical analyst specifies in the PMAP run documentation 331 that if the execution time on consecutive days varies more than five percent, a support person should be notified and should check the process to determine where the error or inefficiency is occurring. The support person to be notified is ascertained by accessing the on-call documentation 332.

The SME's, business analysts, technical analysts and/or other responsible users agree on a schedule for making the SQM reports available to third parties in a particular month and create schedules 333, detailing the availability. The third parties can then access these schedules 333.

The final audit point in the embodiment in FIG. 3 is SME Validation 315. As part of the process of implementing a new or modified SQM in the PMAP 150, an SME performs validation and develops a periodic validation plan 334 to ensure that the program accurately reflects the appropriate performance measure. Once the new or modified program has executed as part of the monthly PMAP 150 production run, the SME performs the validation according to the plan 334. The steps included in the plan may be performed monthly, as shown in FIG. 3, or on another schedule sufficient to validate the underlying process. The validation processes continue for as long as the SQM is in place. The Monthly Validation Plan 334 comprises both automated and manual processes to ensure that the production runs are occurring accurately and reliably.

For example, unless a substantial change occurs in the way a particular provisioning of service occurs, a measure in the SQM describing that provisioning should remain relatively constant. If the measure in SQM changes by more than a few percentage points, an error may have occurred. The validation documentation 334 describes both how to detect when an error has occurred and what to do to diagnose and remedy that error. Validation ultimately helps to determine the adequacy and effectiveness of controls dictated by the PMQAP.

Changes to the PMAP 150 may originate from a number of different sources, including regulatory agencies, competitive local exchange carriers (CLECs) and users within the BOC. Often, the Federal Communications Commission (FCC) requires a third-party audit of a BOC's performance measurement process before a request for providing inter-LATA service is granted. As the auditors examine the performance measurement process, they will often request additional performance measures, which they feel will assist the FCC in making a determination of whether or not to allow the application.

A CLEC may also request additional or modified performance measures to help the CLEC better gauge the level of performance the BOC is providing to the CLEC. An additional or modified performance measure may be required as a result of a CLEC interconnection agreement. For example, the agreement may specify a service that was not previously provided to a CLEC, and therefore, a new performance measurement and quality assurance process must be created.

The BOC's internal uses may also request changes or additions to SQM reports. For example, a system administrator may want an additional performance measurement report created that better reflects peak demand on a element within the network. Also, an internal user may discover an error in a report, prompting a change to the portion of the PMAP 150 that generates the report.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

The invention claimed is:

1. A system for ensuring the accuracy of a telecommunications service provision report comprising:
   a computer system executing a performance measurement application platform for executing a quality assurance process;
   a performance measurement data warehouse;
   a data extractor and loader in communication with the performance measurement data warehouse for populating the performance measurement data warehouse with at least one data point corresponding to a telecommunications service; and
   the performance measurement application platform for:
      identifying a sub-process within a performance measurement process, wherein the performance measurement process is used to generate competitive local exchange carder telecommunication service provision comparison reports,
      identifying an audit point applicable to the sub-process,
      implementing a quality control measure corresponding to the audit point, and
      generating the competitive local exchange carder telecommunication service provision comparison reports.

2. The system of claim 1 wherein;
   wherein the sub-process comprises a change control process, and the audit point applicable to the change control process comprises a subject matter expert developing a business requirement;
   wherein the change control process comprises:
      identifying the business requirement;
      converting the business requirement into a technical requirement;

prioritizing the technical requirement in relation to a plurality of previously identified technical requirements; and performing an implementation of the technical requirement.

3. The system of claim 2, wherein the change control process further comprises:

creating a production release note corresponding to the technical requirement.

4. The system of claim 2, wherein the change control process further comprises:

testing an output from the implementation.

5. The system of claim 2, wherein the identifying the business requirement comprises receiving a change request from a third party.

6. The system of claim 5, wherein the third party comprises a state regulator.

7. The system of claim 5, wherein the third party comprises a federal regulator.

8. The system of claim 5, wherein the third party comprises a competitive local exchange carrier (CLEC).

9. The system of claim 1 wherein the performance measurement data warehouse comprises a relational database.

10. The system of claim 1, further comprising a user interface for interacting with the performance measurement application platform, the user interface including:

a menu of available user interfaces;

an add performance measure user interface, accessible from the menu;

a modify performance measure user interface, accessible from the menu;

a prioritize performance measure change user interface, accessible from the menu; and a performance measure documentation generation user interface, accessible from the menu.

11. The system of claim 10, wherein the user interface comprises:

a business requirement to data field mapping user interface;

a quality control point identification user interface; and a quality control measure entry user interface.

12. The system of claim 10, wherein the sub-process further comprises a production process.

13. The system of claim 10, wherein the production process comprises:

creating a pre-run document describing a proposed production run; and executing a production run corresponding to the proposed production run.

14. The system of claim 13, wherein the production run comprises:

extracting a data point from an operational system;

transforming the data point; and loading the data point into a performance measurement data warehouse.

15. The system of claim 13, wherein the production run comprises creating a manual report.

16. The system of claim 1 wherein the sub-process further comprises a monthly validation process.

* * * * *